United States Patent
Baumgartner et al.

(10) Patent No.: US 7,422,091 B2
(45) Date of Patent: Sep. 9, 2008

(54) DISC BRAKE HAVING AN ELECTROMOTIVELY ACTUATED ADJUSTING SYSTEM

(75) Inventors: Johann Baumgartner, Moosburg (DE); Dieter Bieker, Oberaudorf (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 101 days.

(21) Appl. No.: 10/493,423

(22) PCT Filed: Oct. 1, 2002

(86) PCT No.: PCT/EP02/10989

§ 371 (c)(1),
(2), (4) Date: Dec. 14, 2004

(87) PCT Pub. No.: WO03/036122

PCT Pub. Date: May 1, 2003

(65) Prior Publication Data

US 2005/0103583 A1 May 19, 2005

(30) Foreign Application Priority Data

Oct. 23, 2001 (DE) ................................ 101 52 248

(51) Int. Cl.
*F16D 55/00* (2006.01)
(52) U.S. Cl. .................. 188/71.7; 188/72.9; 188/73.47; 188/162
(58) Field of Classification Search ............... 188/71.7, 188/72.9, 73.46, 73.47, 158, 161, 162, 156, 188/106 F, 106 P
See application file for complete search history.

(56) References Cited

U.S. PATENT DOCUMENTS

| 5,348,123 | A | * | 9/1994 | Takahashi et al. .......... 188/72.1 |
| 5,353,896 | A | | 10/1994 | Baumgartner et al. |
| 6,098,763 | A | * | 8/2000 | Holding ..................... 188/158 |
| 6,234,587 | B1 | | 5/2001 | Gerum et al. |
| 6,250,434 | B1 | * | 6/2001 | Baumgartner et al. ...... 188/71.7 |
| 6,293,370 | B1 | * | 9/2001 | McCann et al. ............ 188/71.8 |
| 6,367,597 | B1 | * | 4/2002 | De Vries et al. .......... 188/196 V |
| 6,634,468 | B2 | * | 10/2003 | Ortegren et al. ............ 188/71.1 |
| 2003/0173164 | A1 | * | 9/2003 | Angerfors .................. 188/71.7 |

FOREIGN PATENT DOCUMENTS

| DE | 37 16 202 A1 | 11/1988 |
| DE | 197 56 519 A1 | 10/1998 |
| DE | 198 10 503 A1 | 6/1999 |
| DE | 198 35 550 A1 | 2/2000 |
| DE | 101 52 248 B4 | 5/2003 |
| EP | 0 291 071 A2 | 5/1988 |
| WO | WO 91/19115 | 12/1991 |
| WO | WO 0002302 A1 * | 1/2000 |

* cited by examiner

*Primary Examiner*—Bradley T King
(74) *Attorney, Agent, or Firm*—Crowell & Moring LLP

(57) ABSTRACT

A disc brake, particularly for utility vehicles, comprising a brake caliper that overlaps a brake disc, a tensioning device for tensioning brake pads, and an adjusting system for compensating for wear to the brake pads and/or brake disc. The adjusting system has at least one electric motor that serves as a drive. The at least one electric motor is mounted on the brake caliper in a manner that permits it to be accessed from the exterior.

9 Claims, 15 Drawing Sheets

DISC BRAKE HAVING AN ELECTROMOTIVELY ACTUATED ADJUSTING SYSTEM

BACKGROUND AND SUMMARY OF THE INVENTION

The invention relates to a disc brake and, in particular, to a disc brake for utility vehicles.

Disc brakes with an electromotively actuated adjusting system are known per se; thus, for example, from German Patent Document DE 197 56 519 A1. A center arrangement of the adjusting drive between the rotating and adjusting screws is also known, for example, from German Patent Document DE 37 16 202 A1 or International Patent Document WO99/05428.

The idea of using an electric adjusting motor for driving the adjusting device of the disc brake has been successful per se. However, it is desirable to create a disc brake in the case of which, on the one hand, the electric motor is particularly easily accessible in order to ensure an uncomplicated exchange of the electric motor. Furthermore, the electric motor should also be arranged at a site of the disc brake which is relatively insensitive to temperatures, so that it will not be subjected to an excessive heat development during braking.

The invention has the object of solving the above-mentioned problems.

The invention achieves this task by providing a disc brake, particularly for utility vehicles, having a caliper which extends over a brake disc, a brake application device for the application of the disc brake, as well as an adjusting system for compensating brake pad wear and/or brake disc wear. The adjusting system has at least one electric motor as a drive, wherein the at least one electric motor is arranged on the caliper such that it is accessible from an exterior of the caliper.

In contrast to the state of the art, at least one or more electric motors are arranged on the caliper such that they are accessible from the outside. This area of the disc brake is subjected to a clearly lower heat development during braking than the caliper interior where heat is transmitted to the elements in the interior of the caliper by way of the brake pads.

Furthermore, a particularly easy exchangeability of the at least one electric motor can be implemented in an exterior area of the caliper or at the caliper exterior.

The at least one electric motor is preferably coupled by way of a driving connection with at least one adjusting device within the caliper, in which case the driving connection can be constructed in a cost-effective manner as a shaft.

If the at least one electric motor is mounted, either completely or in sections, in a recess on the exterior side of the caliper, the electric motor can be protected against weather influences and damage by rocks and the like in a simple manner. This protection can be supplemented by a covering.

If the adjusting system on one or on both sides of the brake disc is constructed as an adjuster module, which can be pre-assembled and which has the driving connection to the electric motor and a reduction gear connected behind the electric motor, an adjusting sleeve being attached to the at least one mounting plate, an easy pre-assembly and final assembly of the adjusting system can be implemented at low cost expenditures.

The invention is suitable for electromotively or pneumatically actuated disc brakes, which have a floating caliper, a fixed caliper or a sliding caliper. One of the adjusting devices, respectively, is preferably constructed on both sides of the brake disc.

Additional advantageous further developments of the invention are described and claimed herein.

In the following, preferred embodiments are described in detail by means of the drawings.

DETAILED DESCRIPTION OF THE DRAWINGS

Figure 13:
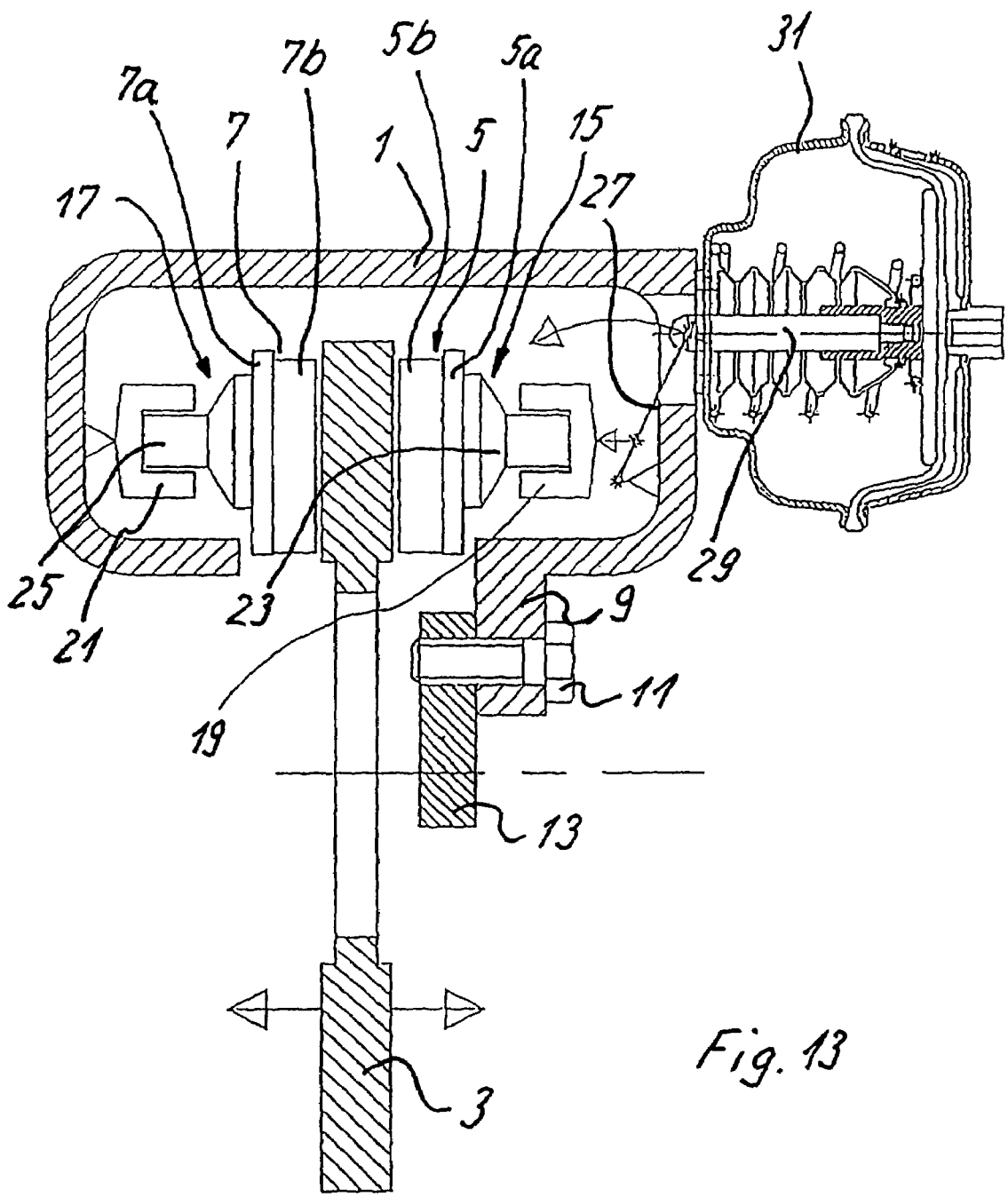
FIG. 13 is a schematic diagram of a disc brake.

FIG. 13 illustrates a preferably pneumatically or electromotively operable disc brake having a caliper 1 which straddles a brake disc 3 in an upper circumferential area of the brake disc.

On both sides of the brake disc 3, brake pads 5, 7 are arranged. The brake pads 5, 7 are displaceable in the direction of the brake disc, as well as away from the brake disc, that is, perpendicularly to the plane of the brake disc 3. The brake pads 5, 7, in a conventional manner, consist of a brake pad carrier 5a, 7a and of a pad material 5b, 7b applied thereto.

In FIG. 13, the caliper 1 is fastened at a right lower section 9, which section extends in the direction of the axle shaft (not shown here) by means of at least one, or preferably more, bolts 11, for example, on an axle flange 13 of the disc brake.

As an example, the brake disc 3 is constructed here as a sliding disc, which is displaceable by the amount of the working stroke to be overcome during braking relative to the brake caliper 1 on the wheel axle. As an alternative, or in addition, the caliper 1 may also be constructed in a displaceable or swivellable manner. In addition, it can be that the caliper 1 and/or the brake disc 3 are, in each case, constructed to be elastically deformable by a portion of the path of the working stroke.

Since, according to FIG. 13, a relative movement exists between the caliper and the brake disc, which movement essentially corresponds to the amount of the working stroke, adjusting devices 15, 17 are provided and necessary on both sides of the brake disc in order to compensate for the release play or the brake pad wear occurring during braking.

On each side of the brake disc 3, the adjusting devices 15, 17 consist of, for example, in each case at least one or more, preferably two, adjusting sleeves 19, 21. Bolt-type extensions 24 (spindles) of pressure pieces 23, 25 are rotatably arranged in the sleeves 19, 21, so that a relative axial mobility exists between the adjusting sleeves 21, 23 as well as the pressure pieces 23, 25 (see FIG. 15). Naturally, a reverse arrangement is also contemplated, in the case of which the pressure pieces 23, 25 have a sleeve-type extension (not shown here) which can be rotated on a bolt (spindle).

The adjusting device 15 illustrated on the right in FIG. 13 is supported on a rotary lever 27 pertaining, in addition to the adjusting device 15, to the brake application device, which rotary lever 27 can be actuated in its area at the top in FIG. 13 by a piston rod 29 of a brake cylinder 31 and which, in its lower part, for example, by way of ball bearing elements (not shown here) or another bearing, is disposed at the caliper. The rotary lever 27 is also disposed on its side facing away from the caliper directly, or by way of intermediate elements, such as balls and/or additional intermediate pieces on the adjusting sleeve 19. In contrast, the adjusting sleeve 21 arranged on the side of the brake disc 1 situated opposite the rotary lever 27 is supported directly at the caliper interior.

Figure 4:
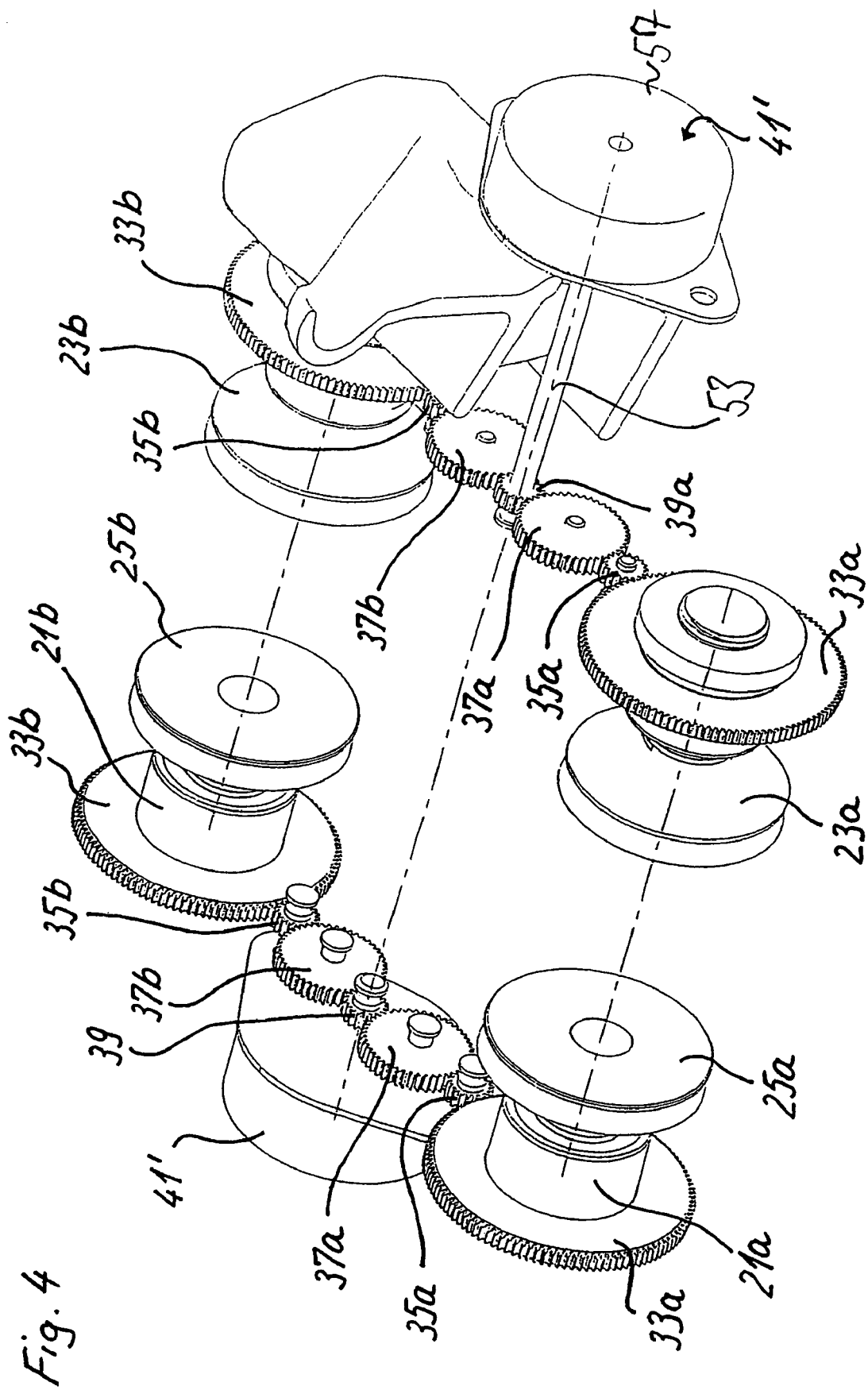
FIG. 4 is a perspective view of the adjusting system of the disc brake of FIG. 1 with only a portion of the rotary lever being shown.
Figure 5:
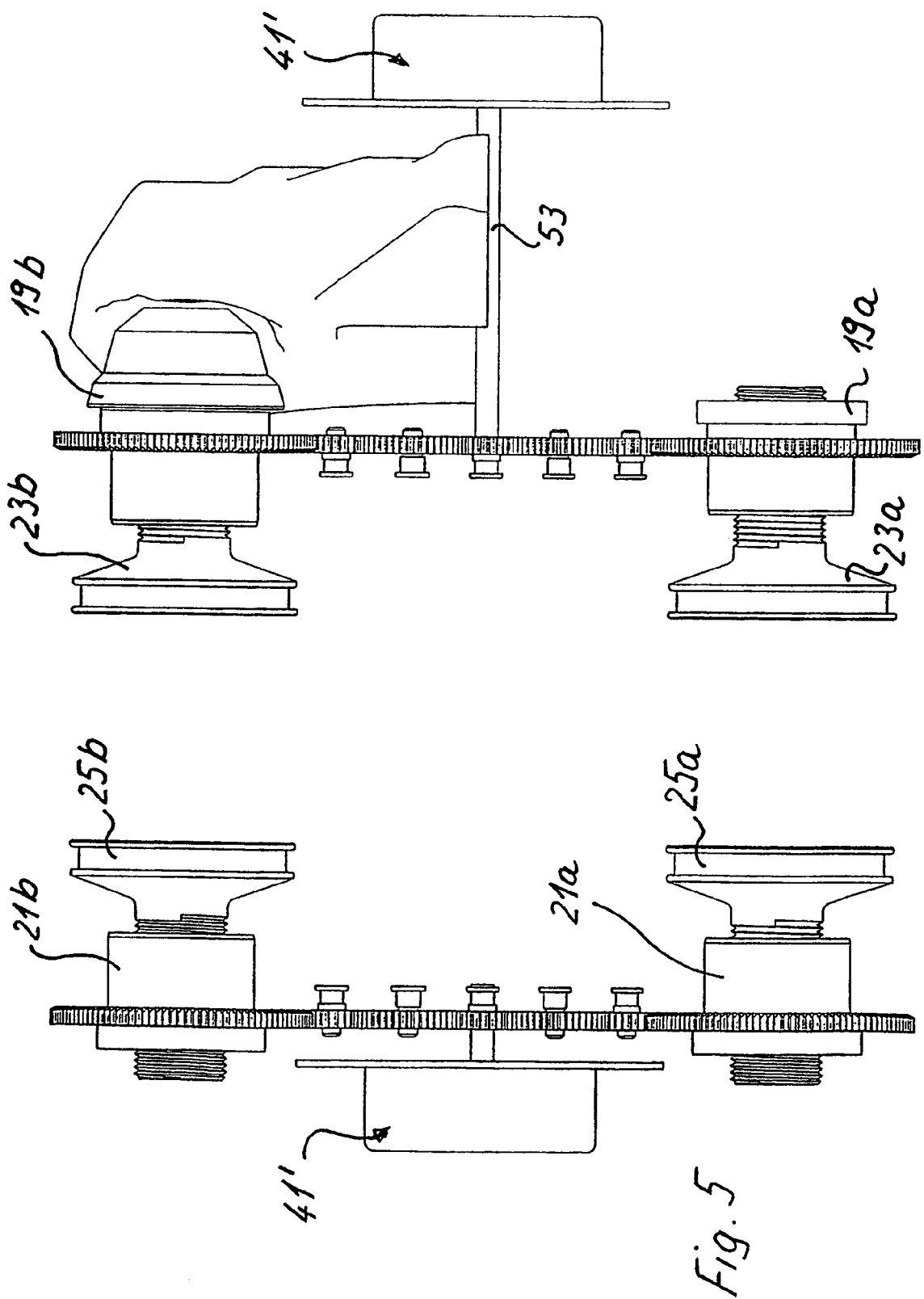
FIG. 5 is a top view of the adjusting system of FIG. 4.
Figure 14:
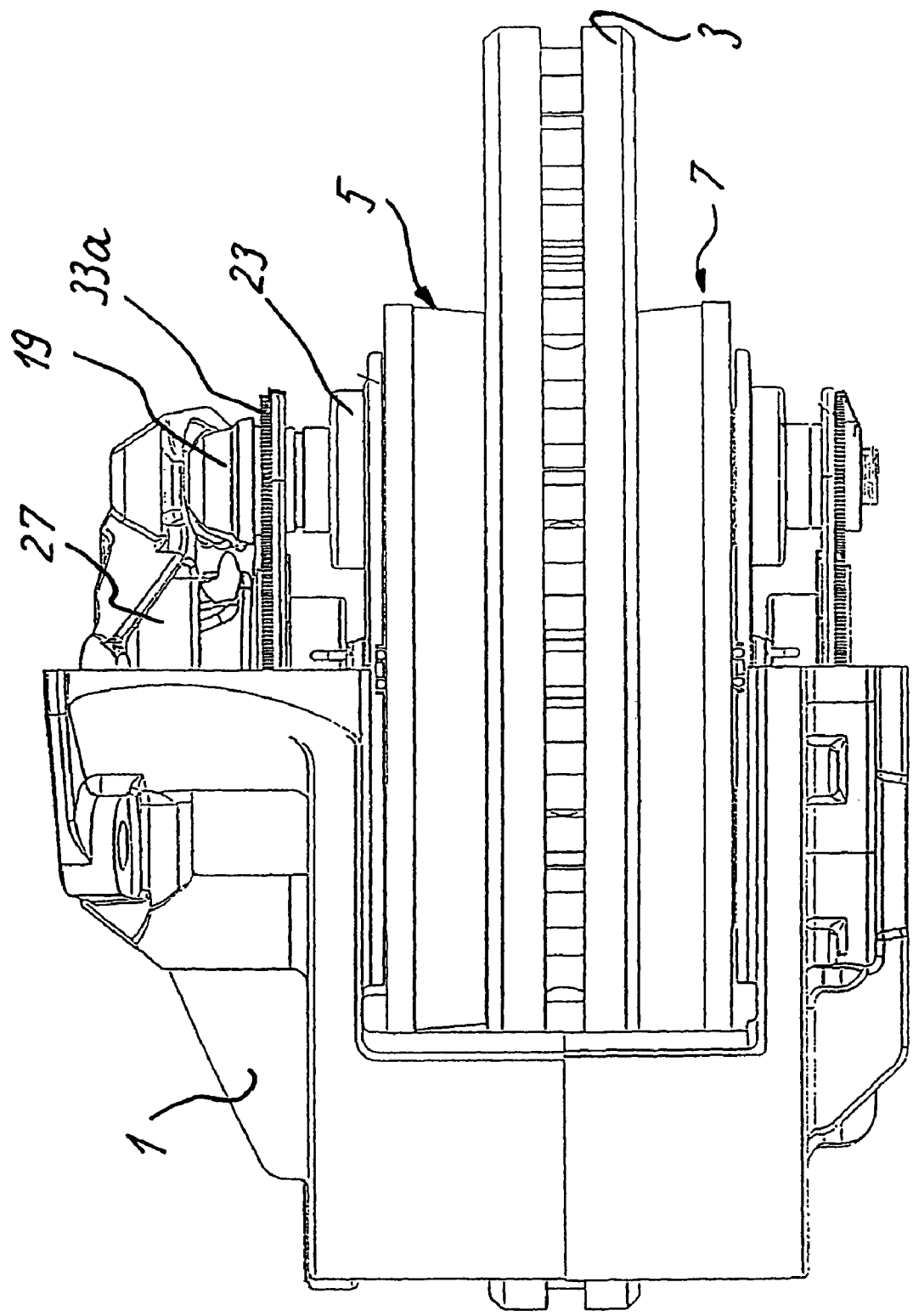
FIG. 14 is a partial, sectional, top view of a disc brake, which can be equipped with an electric motor of the type shown in FIG. 1.

FIG. 14 is a top view of a disc brake of the type shown in FIG. 13, in which case two adjusting sleeves 19$a$, 19$b$ (see also FIG. 15) as well as two pressure pieces 23$a$, 23$b$, 25$a$, 25$b$ (see also FIGS. 4 and 5) are arranged on both sides of the brake disc, which can be mutually synchronized by way of a gear wheel mechanism. This is also illustrated particularly well in FIG. 15. The adjusting sleeve 19$a$ illustrated here is equipped at its outer circumference with a gear wheel 33$a$ or a gear-wheel-type projection, which meshes with a gear wheel 35$a$, which in turn is driven by a gear wheel 37$a$, which in turn is rotated by an output gear wheel 39 of an electric motor 41. All gear wheels 33$a$, 35$a$, 37$a$, 39 are situated in a common plane.

Analogous thereto, the additional adjusting sleeve 19$b$ (see FIG. 15) is also provided with a toothing or a gear wheel 33$b$ (see also FIG. 4) on its outer circumference, which meshes with an additional gear wheel 35$b$, which in turn is rotated by a gear wheel 37$b$, which is also driven by the output gear wheel 39 of the electric motor 41.

In this case, the gear wheels 37$a$, 37$b$ are applied to mutually opposite sides of the output gear wheel 39. All gear wheels 33 to 39 are mounted by means of their axes on a mounting plate 42, which has recesses for the axes of the gear wheels as well as for allowing the adjusting sleeves 19$a$, 19$b$ to extend through.

On the side of the mounting plate 42 situated opposite the gear wheels 33 to 39, an electric motor 41 is arranged in the center between the two adjusting sleeves 19, 21. In their area facing away from the gear wheels 33, the adjusting sleeves 19 reach through shaped-out sections and openings of another second mounting plate 43 arranged parallel to the first mounting plate 42, which second mounting plate 43 has bores 45 for the screwed connection at the caliper 1, so that the second mounting plate 43 is also used as a closing plate for an opening 47 of the caliper 1 facing the brake disc, which opening is illustrated, for example, in FIG. 1. The caliper 1 is provided with bores 49 which correspond with the bores 45.

The pressure pieces 23, 25 are, in each case, inserted into the second mounting plate 43, in which case the shaped-out sections 51 in the second mounting plate 43 are designed for receiving the ends of the pressure pieces that act upon the brake pads.

Figure 15:
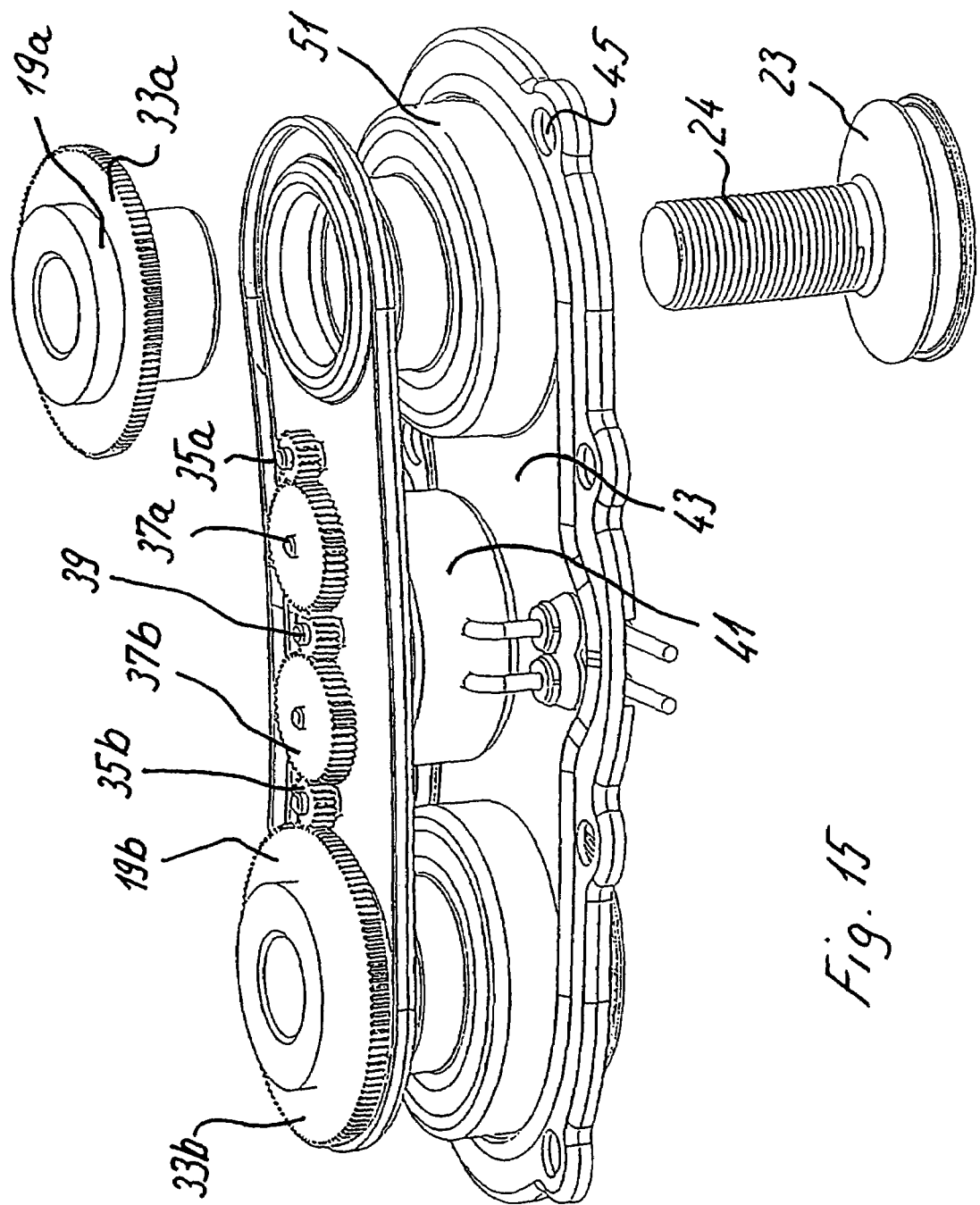
FIG. 15 is a view of an adjusting module.

According to FIG. 15, a constructively simple adjusting module, which can be pre-assembled, is created. This adjusting module can be placed on both sides of the brake disc 3 in a pre-assembled manner in the caliper, after the rotary lever 27 is mounted in the caliper.

This arrangement is cost-effective and compact. Nevertheless, there is a demand for an alternative housing of the electric motor 41 since, in the area between the pressure pieces 23, 25, the motor 41 is subjected to relatively high temperatures.

Figure 1:
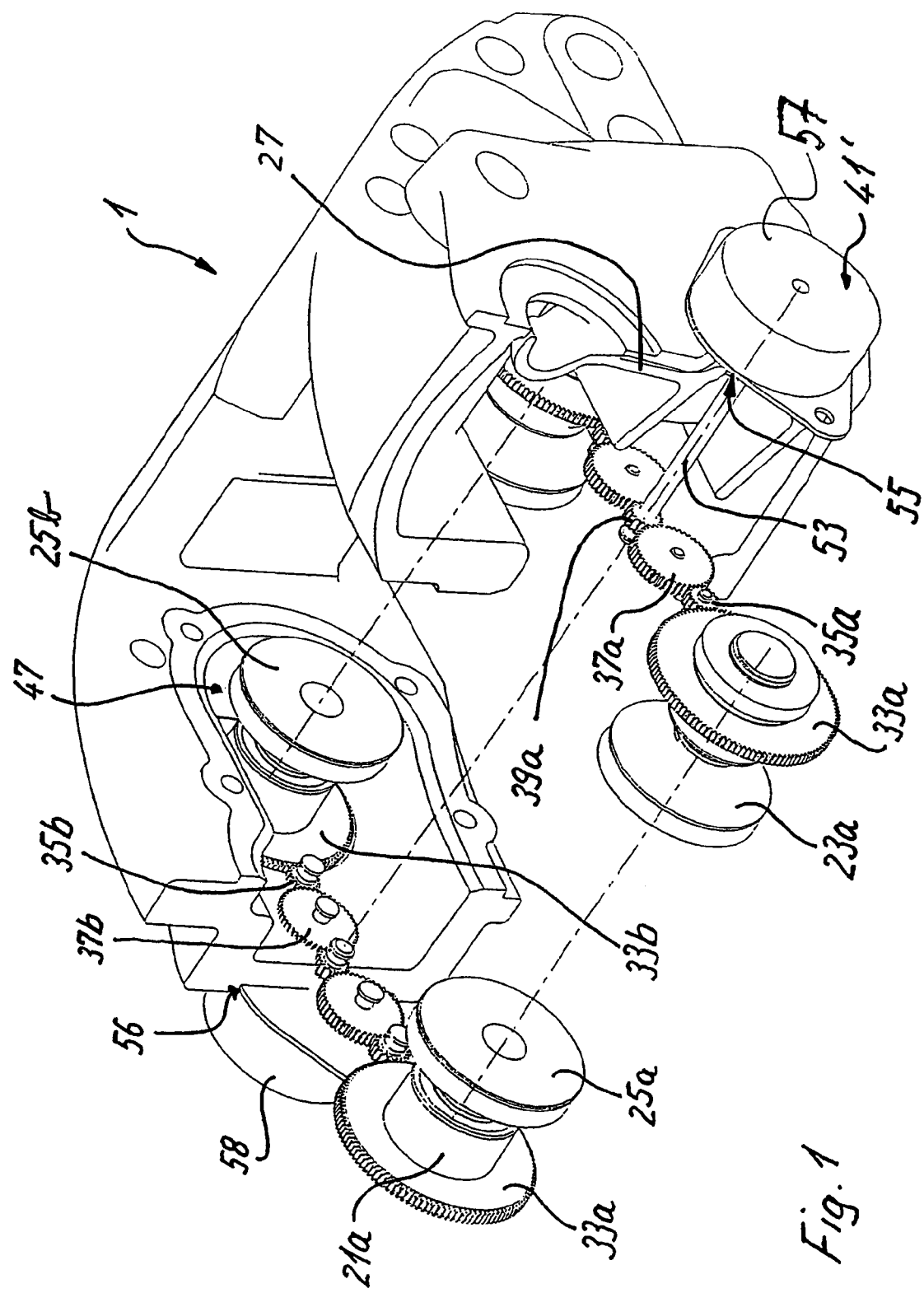
FIG. 1 is a perspective view of essential elements of a first embodiment of a disc brake according to the invention with a caliper which is only partially illustrated.
Figure 2:
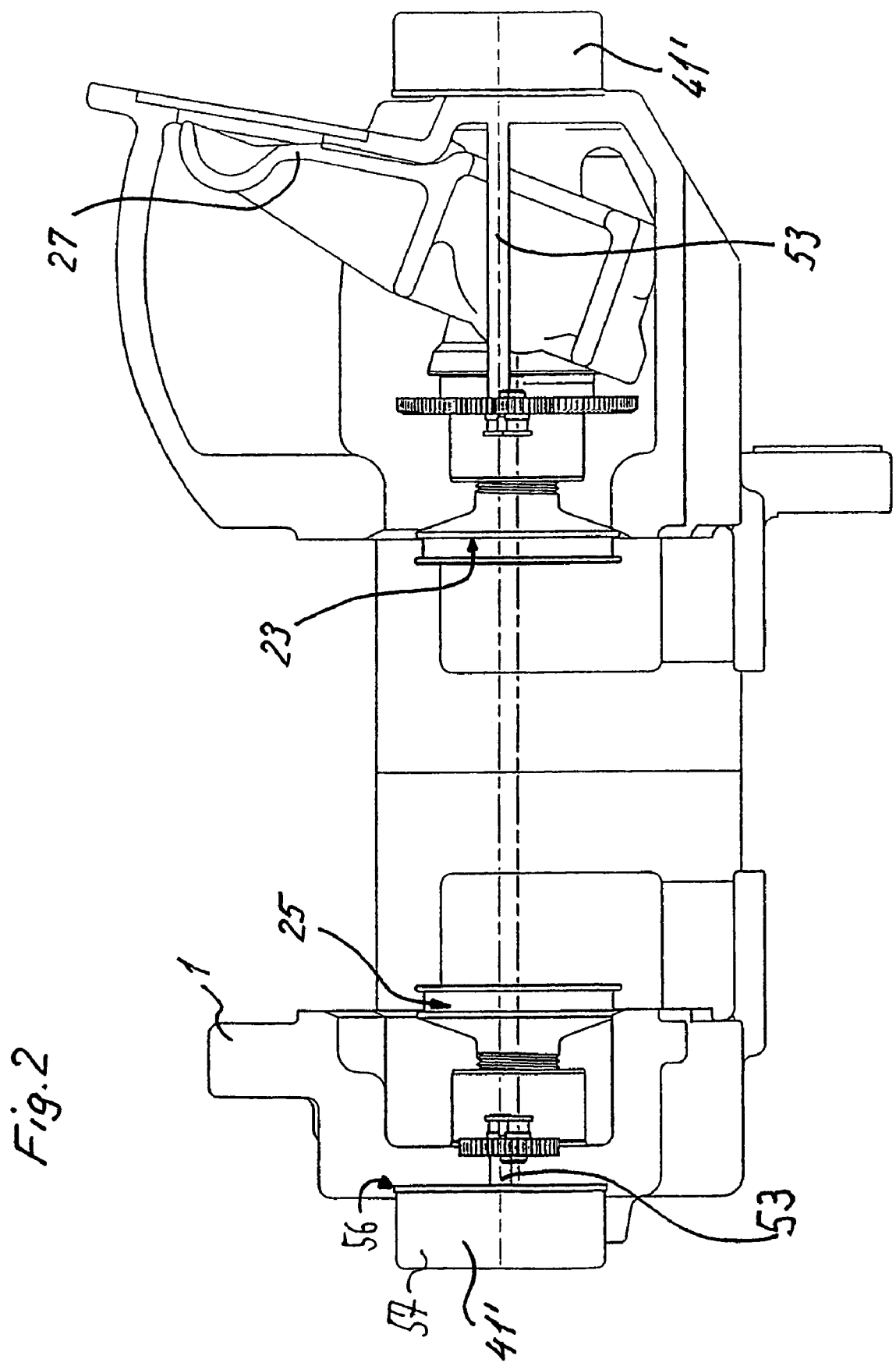
FIG. 2 is a sectional view of the disc brake of FIG. 1.
Figure 3:
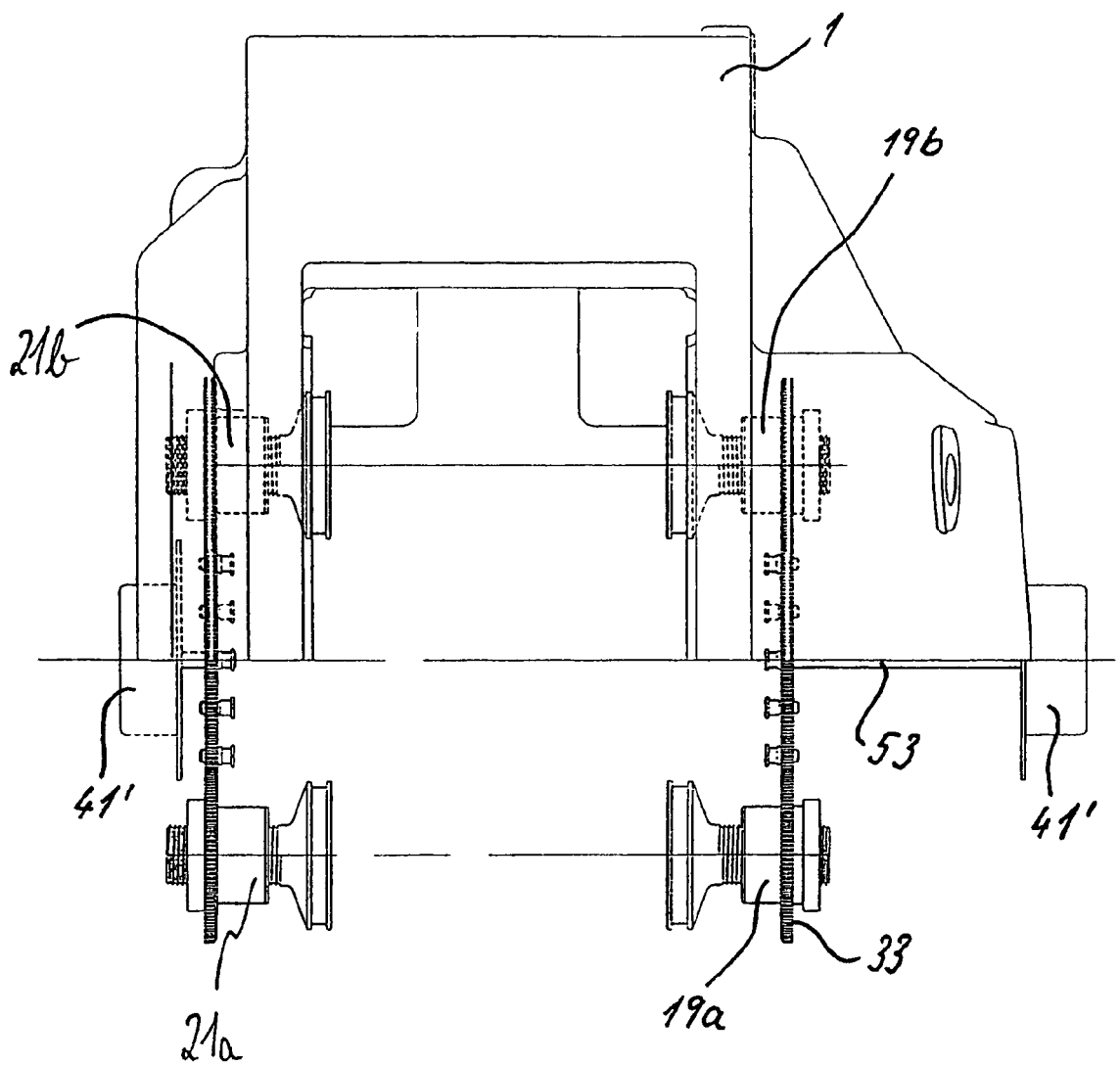
FIG. 3 is a top view of the disc brake of FIG. 1, only a portion of the caliper being shown.

For avoiding this problem, according to FIG. 1, the electric motors 41' are no longer arranged on both sides of the brake disc between the two mounting plates 42, 43. Rather, the electric motors 41' are arranged on the caliper such that they are accessible from the outside, and are connected to the output gear wheel 39 in each case by way of a driving connection—here, a shaft 53 lengthened in the axial direction of the axis of the gear wheel 39. According to FIGS. 1 to 5, the shaft 53, in each case an extension of the shaft of the gear wheel 39, is guided perpendicularly through the caliper to the outside. The rotary lever 27 also has a bore 55 in order to allow the shaft 53 to extend toward the outside (see FIGS. 2-5). The caliper, in each case, also has corresponding bores on both sides of the brake disc which allow for the shaft to extend through (which, however, are not visible in FIG. 1).

On its exterior sides, the caliper 1 can preferably be provided with recesses 56 (visible in FIG. 2 in the left edge), so that the electric motor 41' engages (mounts) in the caliper. The electric motor 41' itself may have a robust covering 57, 58 so that it is securely protected against rough environmental influences.

The important advantage of this arrangement is, on the one hand, the easy accessibility of the electric motor 41' and thus the simple possibility of its exchange. On the other hand, a lower temperature exists on the exterior sides of the caliper 1 during braking than in the caliper interior, so that the electric motor 41', in comparison to the state of the art, according to the invention is subjected to less heating during braking.

In the additional embodiments of FIGS. 6 to 12, it is provided that the two gear wheels or gear-wheel-type extensions 33$a$, 33$b$ at the outer circumference of the adjusting sleeves 19, 21 in turn mesh, in each case, with carries additional gear wheels 61$a$, 61$b$ offset parallel to the gear wheels 35$a$, 35$b$. The additional gear wheels 61$a$, 61$b$ mesh with worm gears 63, 65 which are mounted on a joint shaft 67, which mutually connects the two worm gears 63, 65.

Here, a diagonal alignment exists on one side of the rotary lever 27 such that, relative to the top view of the disc brake, the shaft 67, in each case, at one adjusting sleeve 19$a$ is applied once to the lower circumference of the gear wheel 61$a$ and, at the other adjusting sleeve 19$b$, is applied to the upper circumference of the gear wheel 61$b$. On the opposite side of the brake disc, the engagement of the shaft 67 in the gear wheels 61$a$, 61$b$ is reversed; that is, relative to the top view of the disc brake, the shaft 67, in each case, at one adjusting sleeve 19$b$ is applied to the lower circumference of the gear wheel 61$b$ and, at the other adjusting sleeve 19$a$, is applied to the upper circumference of the gear wheel 61$a$.

Figure 6:
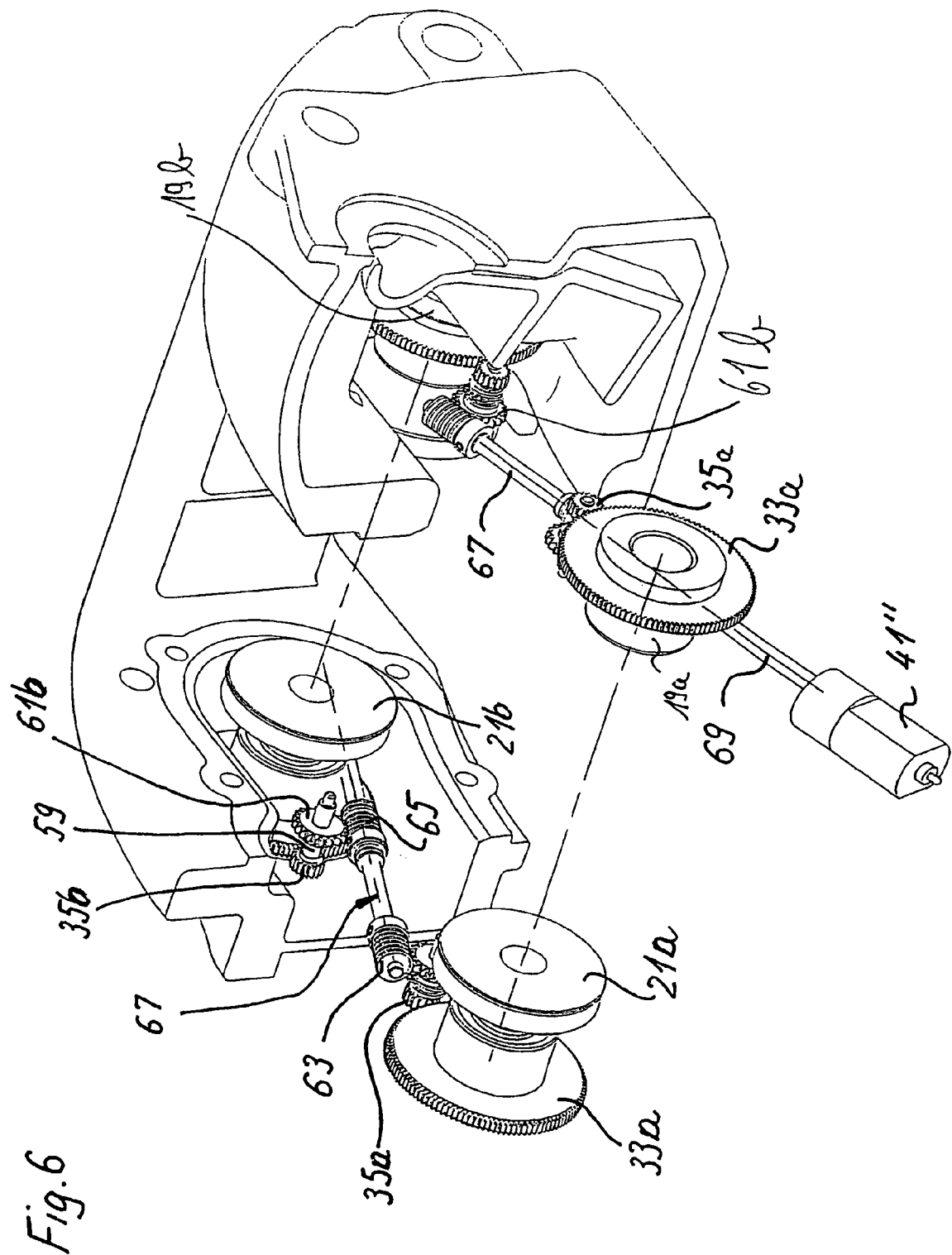
FIG. 6 is a perspective view of essential elements of another embodiment of a disc brake according to the invention with a caliper which is only partially illustrated.
Figure 7:
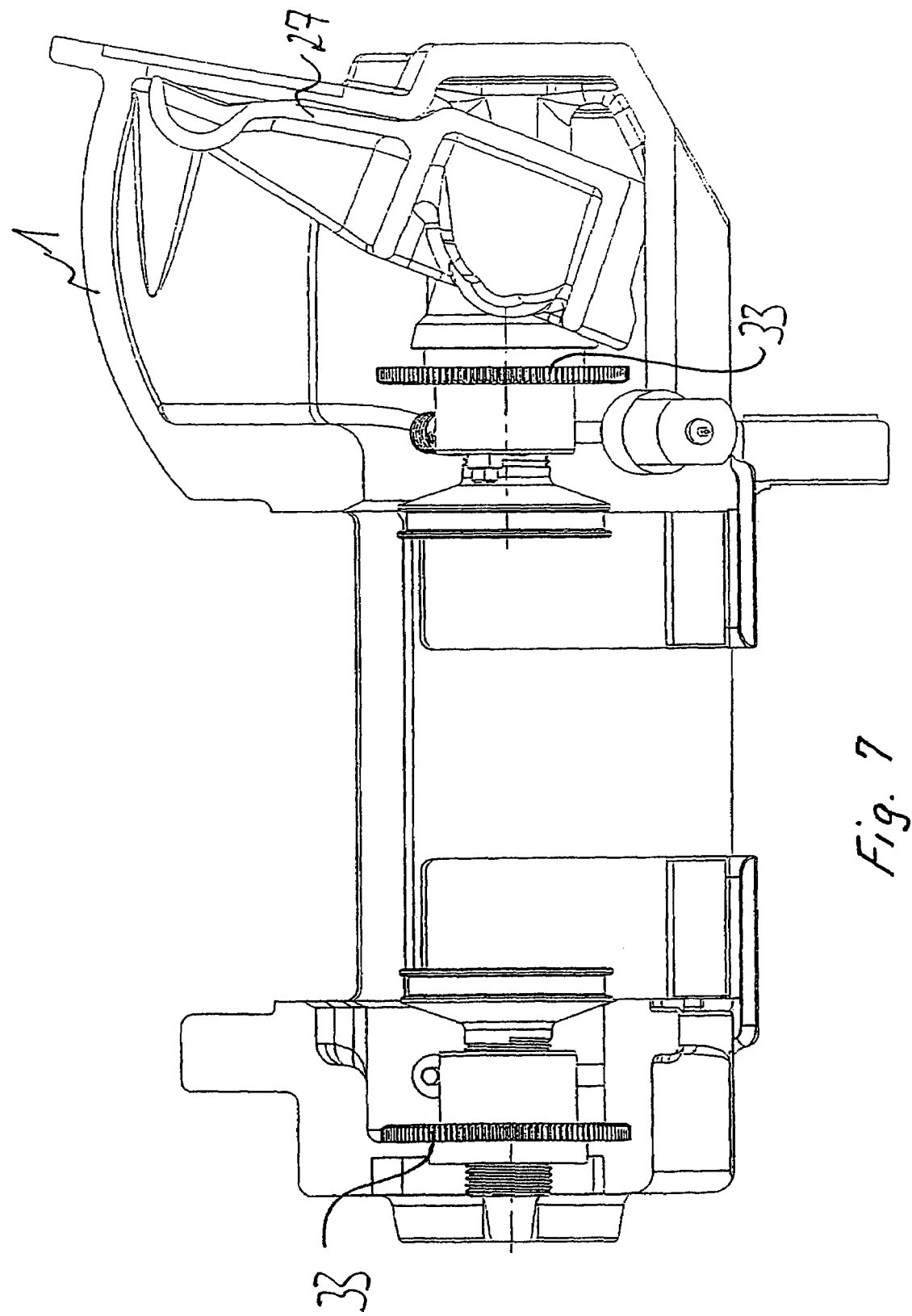
FIG. 7 is a sectional view of the disc brake of FIG. 6.
Figure 8:
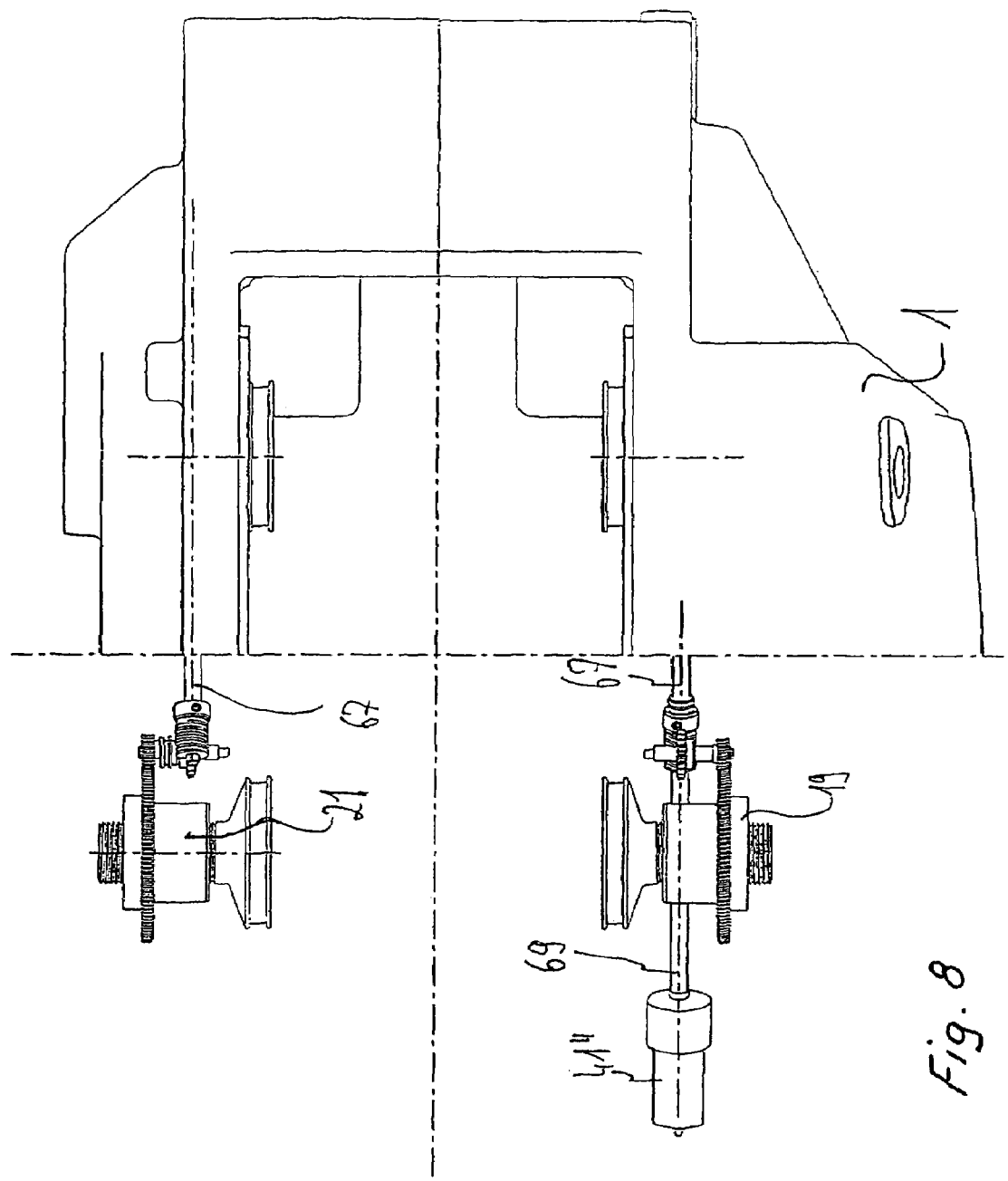
FIG. 8 is a top view of the disc brake of FIG. 7, with only a portion of the caliper being shown.

As indicated particularly clearly in FIG. 6, the shaft 67 is, in each case, constructed to be so long that, as a result of a shaft lengthening 69 of the shaft 67 on both sides of the brake disc 3, in each case a driving connection penetrating the caliper wall to the electric motors 41" is established, which motors 41" are in turn arranged on the outside on the caliper.

Figure 9:
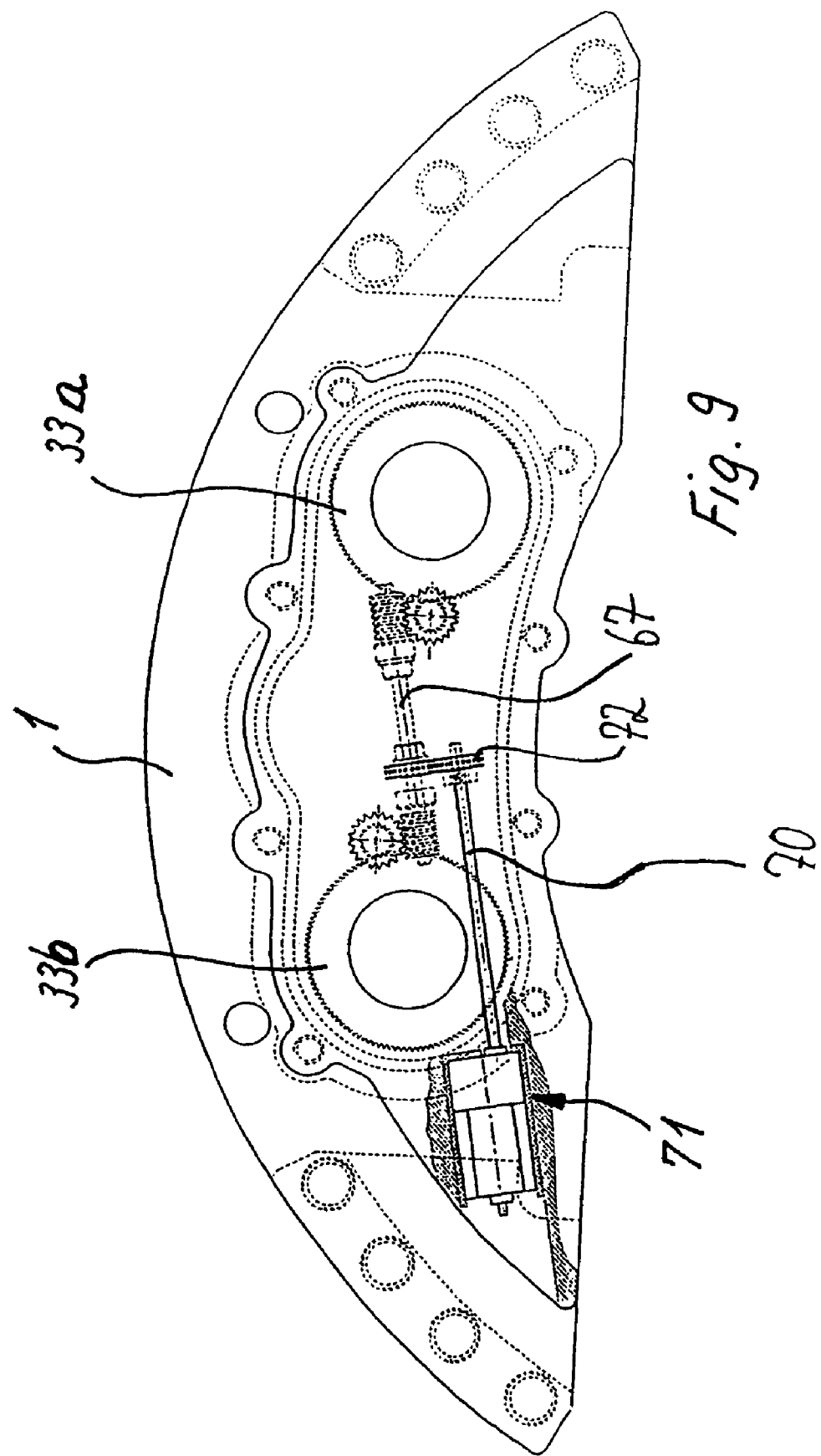
FIG. 9 is a partially transparent view of another disc brake.
Figure 10:
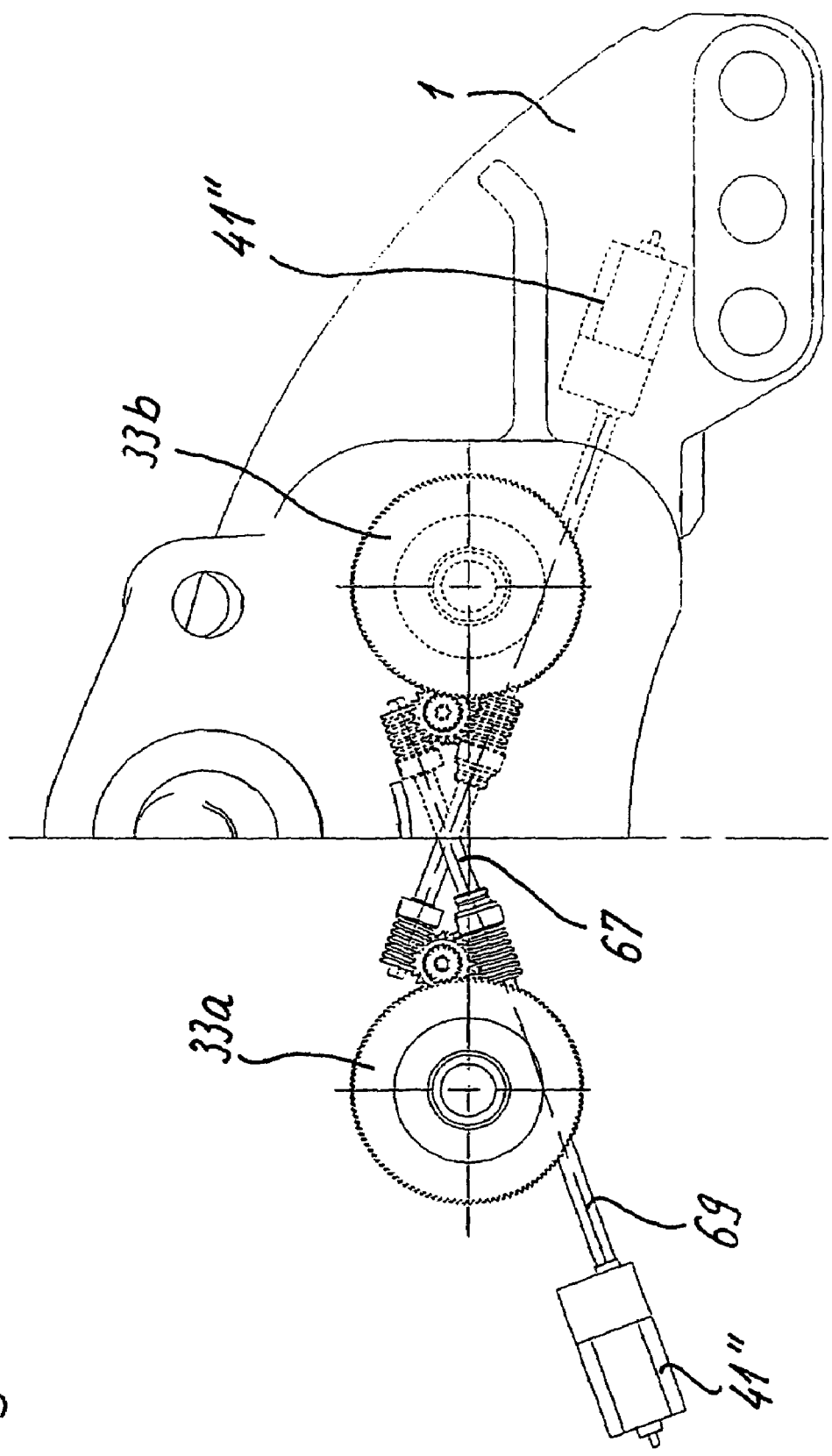
FIG. 10 is another partially sectional and partially perspective view of the disc brake of FIG. 6.
Figure 11:
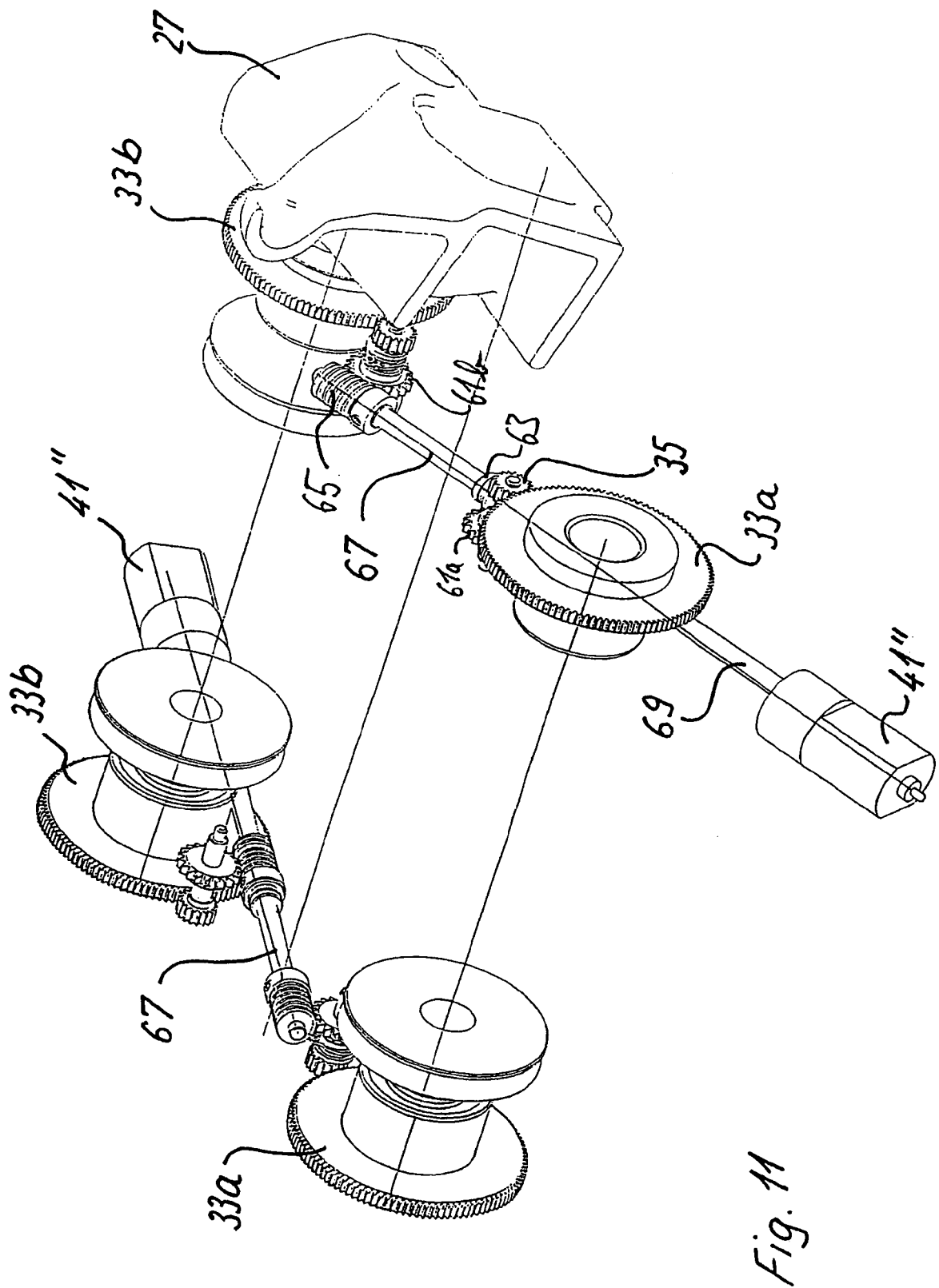
FIG. 11 is a perspective view of the adjusting system of the disc brake of FIG. 6, with a partially illustrated rotary lever.
Figure 12:
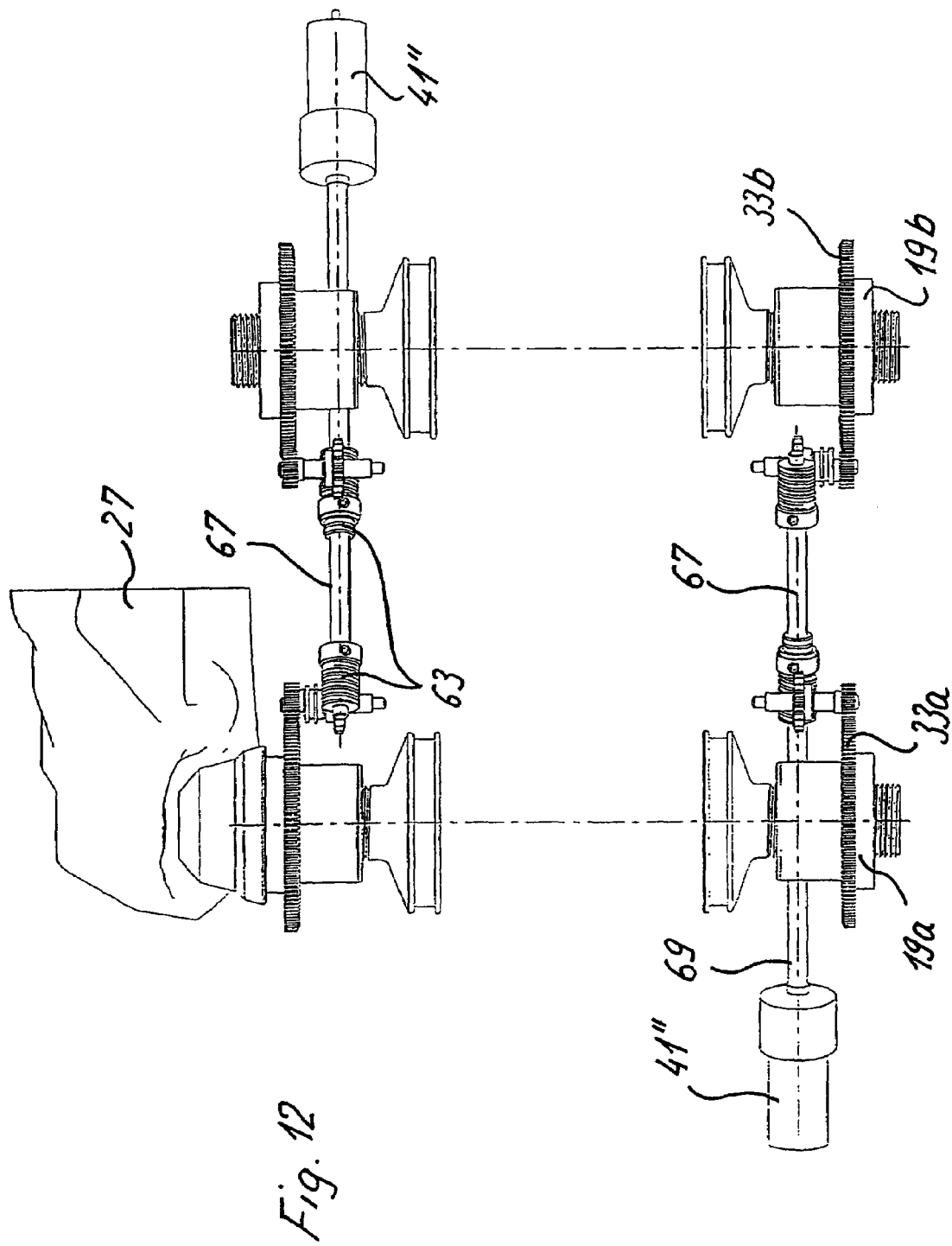
FIG. 12 is a top view of the adjusting system with the rotary lever according to FIG. 11.

As indicated particularly clearly in FIG. 9, the electric motor 41" is situated, for example, in a recess 71 of the caliper, where it is in turn well protected against higher temperatures caused by the braking and can easily be exchanged. According to FIG. 9, instead of an axial extension 69, a separate drive shaft 70 is provided, which is coupled by way of a gear wheel 72 with the shaft 67.

According to FIGS. 1 to 5, as well as according to FIGS. 6 to 12, one of the adjusting devices 15, 17, respectively, is provided on both sides of the brake disc 3. The adjusting devices 15, 17 each have an electric motor (41' or 41") respectively arranged on the exterior side of the caliper 1 relative to the other components of the adjusting devices 15, 17 and are connected by way of bores or the like extending through the caliper with the components of the adjusting devices 15, 17 in the caliper interior.

TABLE OF REFERENCE NUMBERS caliper 1
brake disc 3
brake pad 5
brake pad carrier 5a/5b
brake pad 7
brake pad carrier 7a/7b
section 9
bolt 11
axle flange 13
adjusting device 15
adjusting device 17
adjusting sleeve 19
adjusting sleeve 19a/19b
adjusting sleeve 21
pressure piece 23
pressure piece 23a/23b
spindle 24
pressure piece 25
pressure piece 25a/25b
rotary lever 27
piston rod 29
gear wheel/attachment 33
gear wheel 35
gear wheel 37
gear wheel 39
electric motor 41/41'/41"
mounting plate 42
mounting plate 43
bore 45
opening 47
bore 49
shaped-out section 51
shaft 53
bore 55
indentation 56
covering 57
shaft 59
gear wheel 61
gear wheel 61a/61b
worm gear 63
worm gear 65
shaft 67
axial extension 69
recess 71
gear wheel 72

The invention claimed is:

1. A pneumatically operated disc brake, comprising:
a caliper extending over a brake disc;
a brake application device having a rotary lever, the brake application device displacing brake pads against the brake disc;
an adjusting system that compensates for at least one of brake pad wear and brake disc wear, wherein the adjusting system includes at least one electric motor to drive the adjusting system;
wherein the at least one electric motor is arranged on the caliper such that it is accessible from an exterior of the caliper, the at least one electric motor being drivingly connected with components of the adjusting system arranged within the caliper;
wherein the driving connection includes a shaft that penetrates a wall of the caliper and extends through a bore in the rotary lever of the brake application device.

2. The disc brake according to claim 1, wherein for mounting the at least one electric motor, a recess is provided on an exterior side of the caliper.

3. The disc brake according to claim 2, wherein the electric motor is mounted either completely or partially in the recess.

4. The disc brake according to claim 1, wherein the at least one electric motor has a cover.

5. The disc brake according to claim 2, wherein the at least one electric motor has a cover.

6. The disc brake according to claim 3, wherein the at least one electric motor has a cover.

7. The disc brake according to claim 1, wherein the adjusting system comprises at least one of pressure pieces and adjusting sleeves, and wherein the shaft has one of a gear wheel and one or more worm gears meshing either directly or via additional intermediately connected drive elements with said at least one of the pressure pieces and adjusting sleeves.

8. The disc brake according to claim 1, wherein the disc brake has one of a floating, fixed, and sliding caliper.

9. A pneumatically operated disc brake, comprising:
a caliper extending over a brake disc;
a brake application device having a rotary lever, the brake application device displacing brake pads against the brake disc;
an adjusting system that compensates for at least one of brake pad wear and brake disc wear, wherein the adjusting system includes at least one electric motor to drive the adjusting system;
wherein the at least one electric motor is arranged on the caliper such that it is accessible from an exterior of the caliper, the at least one electric motor being drivingly connected with components of the adjusting system arranged within the caliper,
wherein the driving connection includes a shaft that penetrates a wall of the caliper and extends through a bore in the rotary lever of the brake application device,
wherein the adjusting system includes two adjusting devices, one adjusting device being arranged on each side of the brake disc and including at least two pressure pieces that act upon each brake pad, and
wherein each adjusting device has an associated electric motor, which motor acts upon a synchronization gear coupling rotating movements of the at least two pressure pieces of the adjusting device.

* * * * *